Dec. 12, 1961 R. H. KELLY 3,012,681
MATERIAL LOADING AND HAULAGE APPARATUS
Filed April 3, 1958 4 Sheets-Sheet 4
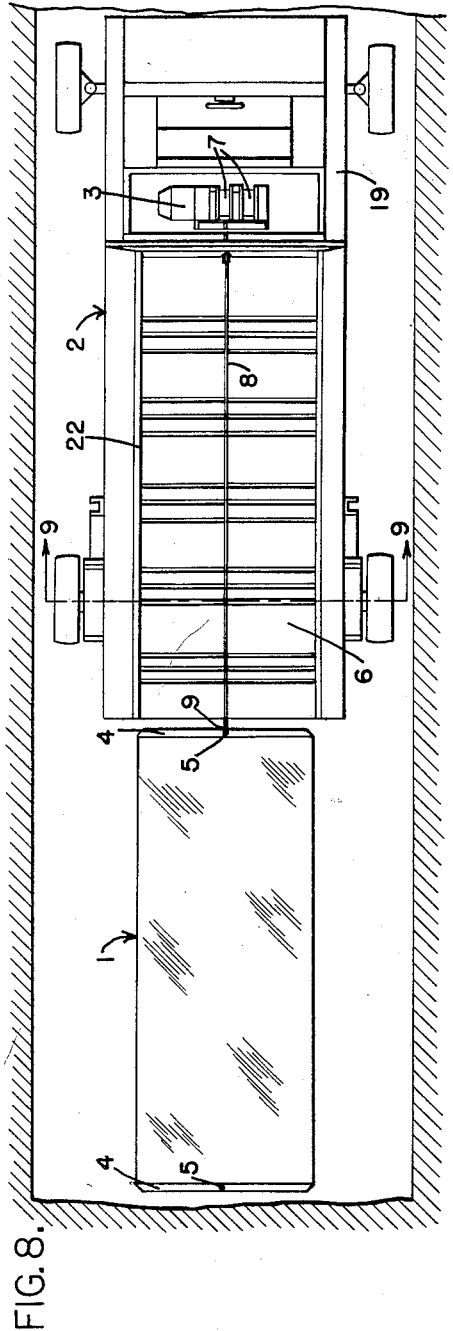
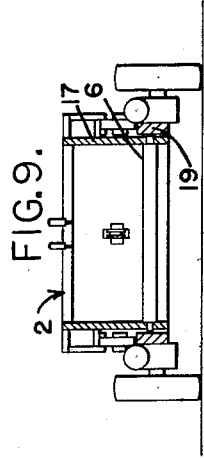
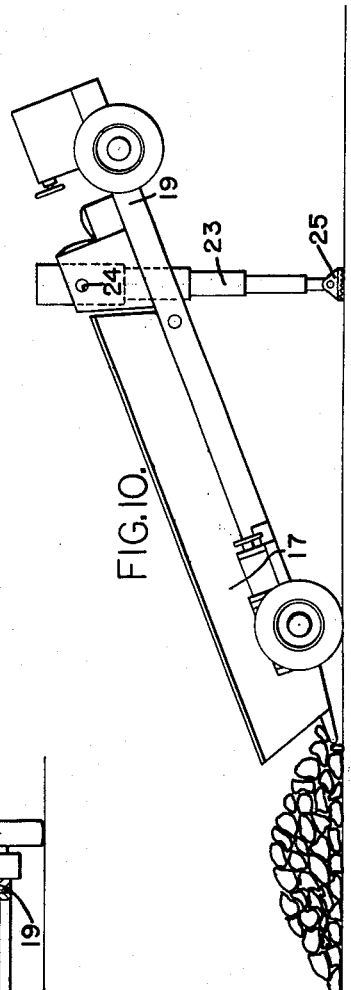
INVENTOR:
RICHARD H. KELLY
BY Charles F. Osgood,
ATTORNEY

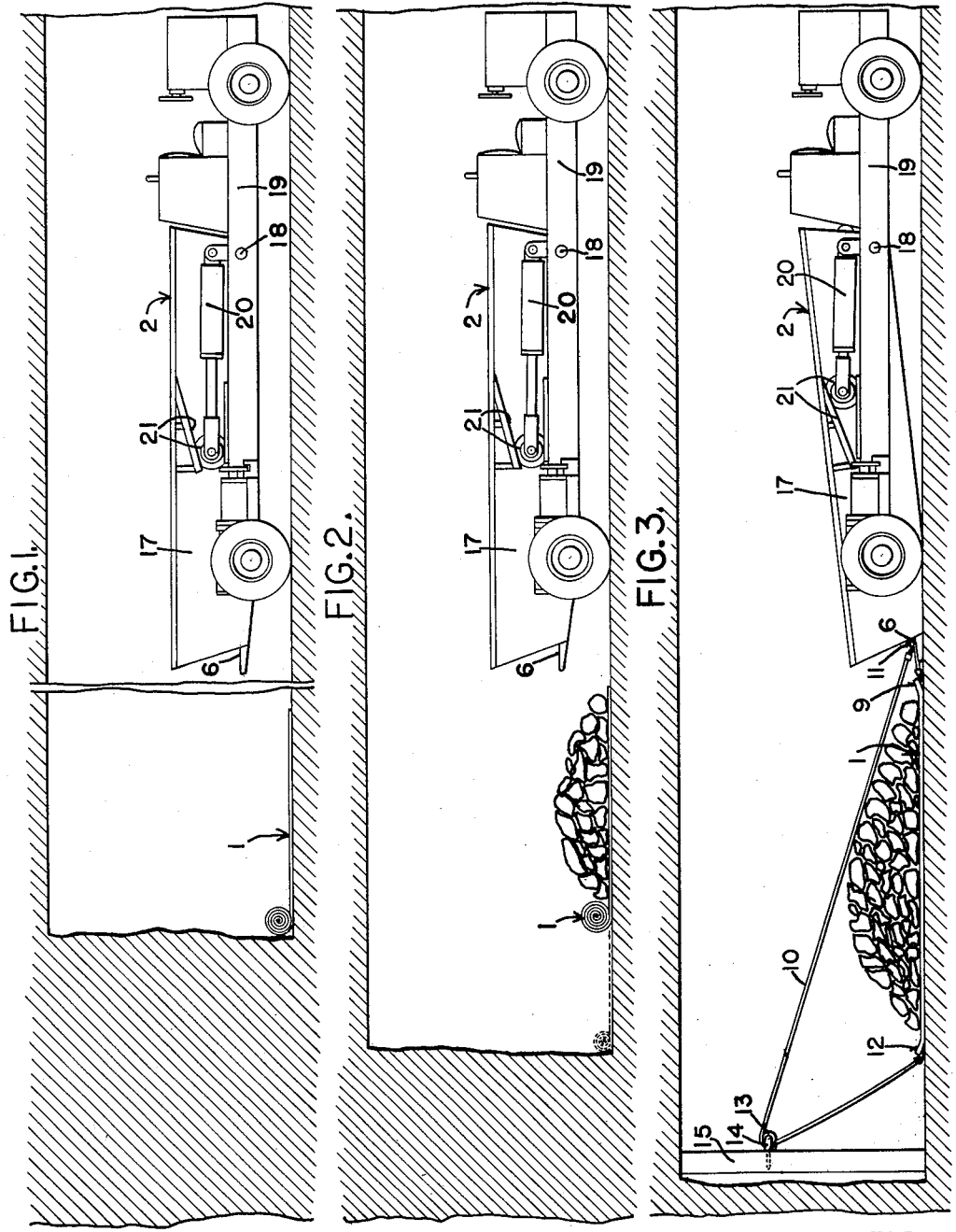

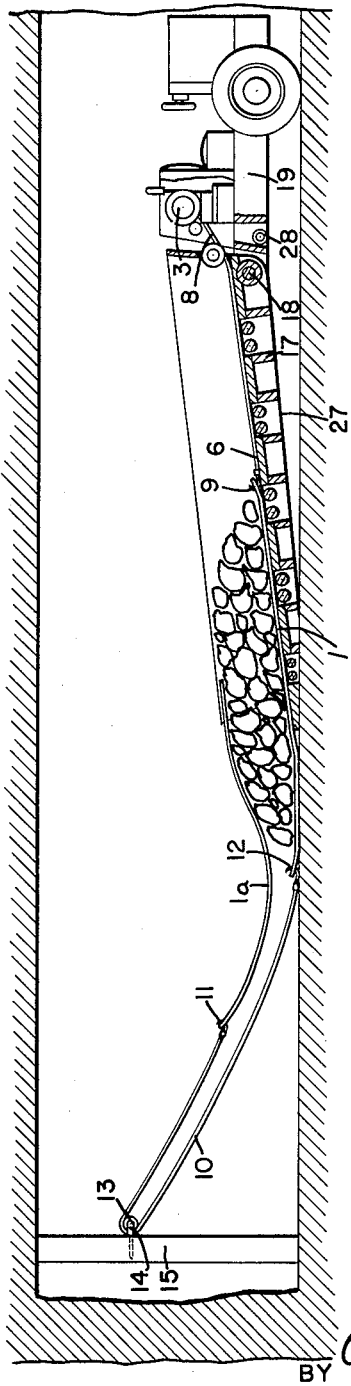

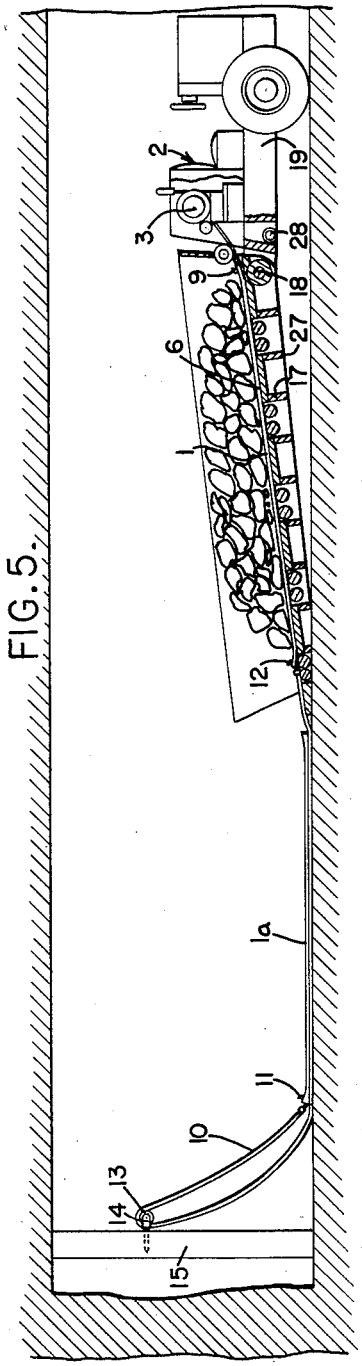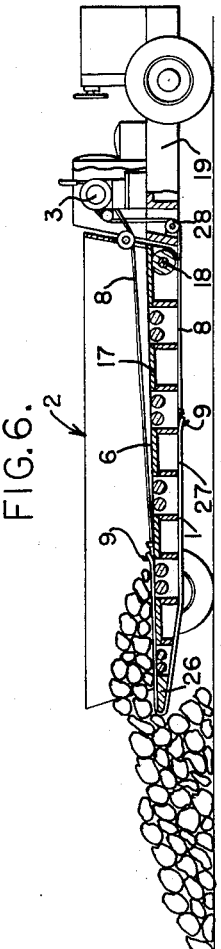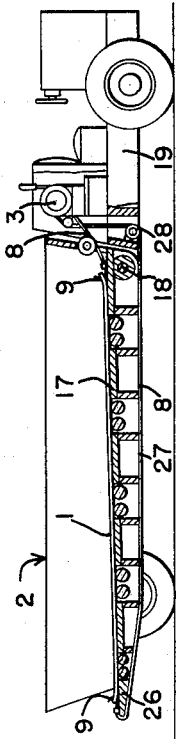

United States Patent Office 3,012,681
Patented Dec. 12, 1961

3,012,681
MATERIAL LOADING AND HAULAGE APPARATUS
Richard H. Kelly, % Fourseam Coal Corporation, Bramwell, W. Va.
Filed Apr. 3, 1958, Ser. No. 726,095
11 Claims. (Cl. 214—38)

This invention relates to material loading and haulage apparatus and more particularly to a so-called mat-loader especially designed for use in truck mines using hand loading.

In relatively small mining operations such as truck mines the dislodged mineral is usually loaded out by hand with relatively simple equipment resulting in a relatively time consuming and laborious operation, and it has been found that the mechanical loading and haulage equipment now available is not only usually too expensive for such operations but is also of substantial height at times making hand loading difficult and time consuming. The present invention contemplates improvements in such mining operations in that equipment of a relatively simple and inexpensive design is provided whereby the labor involved and the time consumed in the loading and haulage operations in so-called truck mines are substantially reduced.

An object of the present invention is to provide an improved material loading and haulage apparatus. Another object is to provide improved loading equipment especially designed for use in truck mines using hand loading. A further object is to provide an improved so-called mat loader which embodies a load receiving mat disposable in the working face and haulage means for moving the mat back and forth with respect to the work. Yet another object is to provide an improved mat loader embodying a flexible mat rolled up close to the face of the work on which material is loaded thereon by hand or otherwise and which may be extended by unrolling as the working face is advanced. A still further object is to provide an improved loading mat which may be moved when loaded over the mine floor onto a transport vehicle which carries haulage means for moving the loaded mat away from the work and for returning the empty mat back to the work. Still another object is to provide an improved transport vehicle for the loading mat whereby the latter when loaded may be moved over the mine floor onto the vehicle and transported by the vehicle to a suitable point of delivery. A still further object is to provide an improved transport vehicle for a loading mat whereby the mat when loaded may be moved onto the vehicle for transport, and the vehicle embodies means whereby the loaded mat may be moved while supported and guided on the vehicle to effect discharge of its load. These and other objects of the invention will, however, hereinafter more fully appear.

In the accompany drawings there are shown for purposes of illustration one form and a modification which the invention may assume in practice.

In these drawings:

FIG. 1 is a side view showing a preferred illustrative form of the improved mat loader in operating position in a mine, with the mat partially rolled up near the working face.

FIG. 2 is a view similar to FIG. 1 showing the mat in partially loaded, partially unrolled position.

FIG. 3 is a similar view showing the loaded mat in position to be hauled up onto the tilted body or ramp of the transport vehicle.

FIG. 4 shows the loaded mat partially moved up onto the tilted body of the transport vehicle and illustrating the manner of returning an empty mat over the load to the working face.

FIG. 5 shows the loaded mat in transport position on the vehicle with an empty mat located on the mine floor near the working face.

FIG. 6 shows the titlted vehicle body in elevated transport position and illustrating the manner of moving the loaded mat relative to the vehicle body to effect discharge of its load.

FIG. 7 shows an empty mat in position on the transport vehicle ready to be returned to the working face.

FIG. 8 is an enlarged plan view of the transport vehicle with an empty mat disposed on the mine floor near the working face.

FIG. 9 is a cross section taken on line 9—9 of FIG. 8.

FIG. 10 shows a modified form of transport vehicle.

In this illustrative construction, as shown in the drawings, a loading member in the form of a mat is generally designated 1, the transport vehicle is generally designated 2, and the latter carries cable haulage means 3 attachable to the loading mat for moving the loading mat away from the working face and for returning an empty mat to the face.

The loading mat 1 may be composed of any suitable flexible material such as reinforced canvas, flexible metal sheeting, etc., and may slide freely on its own bottom over the floor of a mine or ground surface, and in FIG. 1, the mat is shown partially rolled up at the face. The mat may be generally rectangular in plan when unrolled as shown in FIG. 8, and may have transverse end stiffener bars or cross members 4 provided with openings 5 to which hooks of the cable haulage means may be attached.

The haulage means 3, which may assume various forms, is herein mounted on the transport vehicle 2 forwardly of the mat receiving platform 6 and comprises winding drums 7 on which cables 8 are wound. The cables each carry a hook 9 at its free end and the hook of one cable is engageable in the opening 5 at the outer end of the mat. Under certain conditions the hoist may be of the single drum type with a cable wound on a single drum and with the cable carrying a hook at its free end so that the hook may be attached to either end of the mat to pull the latter back and forth. In this instance, a short cable section 10 has hooks 11 and 12 at its opposite ends, and these hooks respectively may be attached to the end of the mat 1 nearer the face (FIGS. 3 and 4) to an empty mat 1a, as shown in FIG. 4, and the cable section 10 passes around a guide pulley 13 carried by a bracket 14 anchored to a roof prop or other support 15 located in adjacency to the working face. Under certain conditions the pulley bracket may be anchored directly to the face or secured to the roof by a conventional roof bolt or other securing means. Thus, when the haulage cable 8 is wound in by its drum the loaded mat may be moved away from the working face and up onto its transport vehicle while the empty mat 1a may be moved by its attachment with the cable section 10 from the transport vehicle over the load on the loaded mat back toward the working face, in the manner shown in FIG. 4.

The transport vehicle 2 may assume various forms but herein for illustrative purposes comprises an automobile truck of the type generally used in truck mines and, in this instance, the truck body has a tiltable ramp or body portion 17 which is pivoted at 18 on a truck frame 19. Suitable power operated means such as hydraulic jacks 20 and associated cam and roller mechanisms 21 may be employed for tilting the ramp or body portion 17. The ramp or tiltable body portion provides the platform 6 which has a suitable guideway or guiding surface 22 along which the loaded mat may be moved by its haulage means.

In the modification shown in FIG. 10, in lieu of the tilting ramp or body portion of the transport vehicle, the latter may be tilted bodily about its rear axle after traveling out of the mine passageway or outside of the mine, to dump its load and conventional telescopic hydraulic jacks 23 are provided pivoted at 24 on the vehicle frame and having a pivoted ground engaging shoe 25. Evidently various forms of transport vehicles may be used to shuttle the loading mat between its discharge point and the working face.

In FIGURE 1 the mat 1 is shown partially rolled up near the working face and loose mineral shot down from the face may fall onto the partially unrolled mat and loose mineral on the mine floor may be shoveled by hand or otherwise loaded onto the mat. As the working face advances the mat may be further unrolled to bring it up to the advanced face as shown in dotted lines in FIG. 2.

When the mat has been loaded with loose mineral, as shown in FIG. 3, the cable 8 may be attached to the mat and the latter may be dragged over the mine floor away from the face and up the guideway of the inclined ramp onto the transport vehicle (see also FIGS. 4 and 5). As the loaded mat is moved up onto the transport vehicle an empty mat 1a may be moved back over the load toward the working face, in the manner previously described. When the loaded mat assumes its position on the transport vehicle, as shown in FIG. 5, the hydraulic jacks 20 may be operated to tilt up the ramp into its horizontal transport position, and the vehicle may then be driven to a point of delivery remote from the working face, as for example, to a discharge point outside of the mine passageway or outside of the mine.

When it is desired to unload the vehicle the cables of the haulage means may be attached to the ends of the loaded mat on the vehicle and the loaded mat may be drawn along its guideway on the truck platform around the inner curved rear end 26 of the ramp along a guideway 27 beneath the platform of the vehicle, with the cables passing over suitable guide sheaves 28, and as the mat is moved toward the position shown in FIG. 6 the load thereon is discharged rearwardly from the vehicle. In FIG. 10, the load on the mat is discharged from the vehicle by tilting the entire vehicle about its rear axle as above explained. When the mat is unloaded it may be returned by the cable haulage means back upon the top of the platform, as shown in FIG. 7. The short cable section 10 may then be attached at its ends respectively to the empty mat and to the loaded mat, as shown in FIGS. 3 and 4, and as the loaded mat is drawn away from the face toward the transport vehicle the empty mat moves over the load (FIG. 3) back toward the working face. When it is desired to shoot down the face the prop 15 and guide pulley 13 may be removed.

As a result of this invention an improved material loading and haulage apparatus is provided especially designed for use in truck mines using hand loading whereby the loading and haulage operations are simplified, with greater efficiency. By the provision of the flexible mat which is rolled up at the face and dragged over the mine floor onto a transport vehicle not only is a low height construction obtained but also a construction which is relatively simple and inexpensive in design. The loading mat and its associated cable haulage means not only enables the loaded mat to be moved away from the face but also enables the empty mat to be drawn over the load back toward the face. The improved transport vehicle with its loading platform having guiding surfaces over which the mat may move enables the load on the mat to be readily discharged from the vehicle simply by drawing the mat along its guideways to an inoperative position beneath the loading platform. These and other advantages of the invention will be clearly apparent to those skilled in the art.

While there are in this application specifically described one form and a modification which the invention may assume in practice, it will be understood that this form and modification of the same are shown for purposes of illustration and that the invention may be further modified and embodied in various other forms without departing from its spirit or the scope of the appended claims.

What I claim as new and desire to secure by Letters Patent is:

1. In combination, a flexible mat having a relatively large substantially imperforate load receiving surface and resting on the floor of a mine at a point near the working face, cable haulage means for moving the loaded mat over the mine floor toward a point of discharge, and a second a empty mat located near the point of discharge, said cable haulage means including an intermediate cable section attached to the empty and loaded the mats so that the loaded mat drags the empty mat back toward the working face concurrently with movement of said loaded mat away from the face.

2. A combination as set forth in claim 1 wherein a cable guide is positioned close to the face for guiding said intermediate cable section during movement of said loaded mat away from the face and said empty mat toward the face.

3. In combination, a flat low height load receiving member having a relatively large substantially imperforate load receiving surface and disposable on the mine floor at a point close to the working face of a mine vein and movable over the floor toward a point of discharge, a mobile transport vehicle for receiving the loaded member for transport and from which the load on said member may be discharged, said vehicle having guiding means for guiding said load receiving member during its discharging movement on the vehicle while said member remains on said vehicle, cable haulage means on said vehicle and connected to said member for dragging the loaded member over the floor and up on to the vehicle for transport by the latter, said vehicle providing a guideway for guiding said member during movement thereof onto the vehicle and a supporting surface for supporting the loaded member on the vehicle during transport, said load receiving member moving along said supporting surface during its discharging movement.

4. In combination, a flat low height load receiving member having a relatively large substantially imperforate load receiving surface and disposable on the mine floor at a point close to the working face of a mine vein and movable over the floor toward a point of discharge, a mobile transport vehicle for receiving the loaded member for transport and from which the load on said member may be discharged, cable haulage means on said vehicle and connected to said member for dragging the loaded member over the floor and up onto the vehicle for transport by the latter, said vehicle providing a guideway for guiding said member during movement thereof onto the vehicle and a supporting surface for supporting the loaded member on the vehicle during transport, said vehicle having a platform with top and bottom guiding surfaces the top one of which provides said supporting surface, and said cable haulage means being operative to move the loaded member from its transport position on the top supporting surface toward its inoperative unloaded position along said bottom guiding surface beneath the platform to effect discharge of the load from said member and the vehicle.

5. A combination as set forth in claim 4 wherein said platform is tiltable to provide an inclined ramp over which the loaded member moves onto the vehicle and beneath which said member moves as its load is discharged from the vehicle, said ramp being horizontally disposed when said member moves therebeneath during discharge.

6. In combination, a flexible low height load receiving mat slidable on its own bottom over the floor of a mine and having a relatively large substantially imperforate load receiving surface, said mat adapted to flex as it moves over an uneven floor surface and disposable close to the working face at a point to receive a load, a mobile transport vehicle located remote from the face for receiving the loaded mat and from which the mat is unloaded while it remains supported by said vehicle, cable haulage means on said vehicle and attachable to the opposite ends of said mat for moving the latter relative to said vehicle onto the latter and to return an unloaded mat to the working face, said cable haulage means also operating to move the loaded mat relative to the vehicle while supported thereon to discharge its load from the vehicle during such latter movement, and guiding means both at the face and on said vehicle for guiding said haulage means during guiding of said mat relative to the face and said vehicle.

7. In combination, a flexible mat having a relatively large substantially imperforate load receiving surface and adapted to rest on and move over the floor of a mine, said mat freely flexing as it moves over an uneven floor surface, cable haulage means located near the discharge point for moving the loaded mat between its loading point near the working face and a point of discharge, and a second mat which has discharged its load, said haulage means including a haulage cable section attached to the loaded mat whereby the empty mat is dragged back toward the working face concurrently with the movement of said loaded mat away from the working face.

8. A combination as set forth in claim 7 wherein means is provided at the discharge point and operated by said cable haulage means for effecting discharge of the load from said loaded mat.

9. A combination as set forth in claim 7 wherein a transport vehicle is provided for said loaded mat and by which said cable haulage means is carried, said transport vehicle embodying means whereby the load on said loaded mat may be discharged from the latter while said mat is carried by said transport vehicle.

10. A combination as set forth in claim 8 wherein a transport vehicle is provided for receiving the loaded mat and by which said cable haulage means and said load discharge means are carried.

11. In a loading and haulage mechanism, a flexible load receiving mat having a relatively large load receiving surface and positionable at a point near the working face of a mine vein at which it may receive a load, a mobile transport vehicle located remote from the face for receiving the loaded mat for transport, a cable haulage means on said vehicle and attached to said mat for dragging said mat when loaded over the mine floor away from the working face and in one direction up onto the vehicle, said vehicle having a guideway for guiding said mat during loading thereof onto the vehicle and a surface for supporting the loaded mat during transport, said mobile vehicle having means for guiding said mat for movement from its transport position on the vehicle in the opposite direction to an inoperative position thereon thereby to effect discharge of the mat load from the vehicle during such movement, said cable haulage means operative to move said mat between its transport position on the vehicle and its inoperative unloaded position on the vehicle.

References Cited in the file of this patent

UNITED STATES PATENTS

| | | |
|---|---|---|
| 276,498 | Stone | Apr. 24, 1883 |
| 1,351,932 | Unger | Sept. 7, 1920 |
| 1,571,318 | Burkett | Feb. 2, 1926 |
| 2,120,042 | Remde | June 7, 1938 |
| 2,143,522 | McCarthy | Jan. 10, 1939 |
| 2,161,547 | Joy | June 6, 1939 |
| 2,186,463 | Maine | Jan. 9, 1940 |
| 2,422,910 | Katinos | June 24, 1947 |
| 2,530,350 | Ehlert | Nov. 14, 1950 |
| 2,609,952 | Balzer et al. | Sept. 9, 1952 |
| 2,745,566 | Bouffard | May 15, 1956 |

FOREIGN PATENTS

| | | |
|---|---|---|
| 733,782 | France | July 18, 1932 |